US009602500B2

(12) United States Patent
Nayshtut et al.

(10) Patent No.: US 9,602,500 B2
(45) Date of Patent: Mar. 21, 2017

(54) SECURE IMPORT AND EXPORT OF KEYING MATERIAL

(71) Applicant: INTEL CORPORATION, Santa Clara, CA (US)

(72) Inventors: Alex Nayshtut, Gan Yavne (IL); Hormuzd M. Khosravi, Portland, OR (US); Omer Ben-Shalom, Rishon Le-Tzion (IL); Barry R. Pivitt, Hillsboro, OR (US); Ned M. Smith, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 467 days.

(21) Appl. No.: 14/367,434

(22) PCT Filed: Dec. 20, 2013

(86) PCT No.: PCT/US2013/076852
§ 371 (c)(1),
(2) Date: Jun. 20, 2014

(87) PCT Pub. No.: WO2015/094326
PCT Pub. Date: Jun. 25, 2015

(65) Prior Publication Data
US 2016/0323264 A1 Nov. 3, 2016

(51) Int. Cl.
H04L 9/08 (2006.01)
H04L 29/06 (2006.01)
H04L 9/32 (2006.01)

(52) U.S. Cl.
CPC ........ H04L 63/0823 (2013.01); H04L 9/3268 (2013.01); H04L 63/0428 (2013.01); H04L 63/06 (2013.01); H04L 63/061 (2013.01)

(58) Field of Classification Search
CPC ... H04L 63/0428; H04L 63/06; H04L 63/061; H04L 63/0823; H04L 9/3268; H04L 9/0894
See application file for complete search history.

(56) References Cited

U.S. PATENT DOCUMENTS 6,122,742 A * 9/2000 Young ................... H04L 9/0894
380/278
6,192,130 B1 * 2/2001 Otway ............... G06Q 20/3672
380/1

(Continued)

FOREIGN PATENT DOCUMENTS

CN 103281188 A * 9/2013 .......... H04L 9/0825
EP 2393007 3/2013
WO WO2013100954 7/2013

OTHER PUBLICATIONS

International Searching Authority, "Notification of Transmittal of the International Search Report and the Written Opinion of the International Searching Authority," mailed Sep. 23, 2014, in International application No. PCT/US2013/076852.

Primary Examiner — Farid Homayounmehr
Assistant Examiner — Zhimei Zhu
(74) Attorney, Agent, or Firm — Trop, Pruner & Hu, P.C.

(57) ABSTRACT

An embodiment includes a method executed by at least one processor of a first computing node comprising: generating a key pair including a first public key and a corresponding first private key; receiving an instance of a certificate, including a second public key, from a second computing node located remotely from the first computing node; associating the instance of the certificate with the key pair; receiving an additional instance of the certificate; verifying the additional instance of the certificate is associated with the key pair; and encrypting and exporting the first private key in response to verifying the additional instance of the (Continued)

certificate is associated with the key pair. Other embodiments are described herein.

23 Claims, 7 Drawing Sheets

(56) References Cited

U.S. PATENT DOCUMENTS

| | | | |
|---|---|---|---|
| 6,282,295 B1 * | 8/2001 | Young | H04L 9/0894 380/286 |
| 6,389,136 B1 * | 5/2002 | Young | H04L 9/0894 380/28 |
| 8,954,732 B1 * | 2/2015 | Watsen | H04L 9/3263 713/157 |
| 9,313,032 B2 * | 4/2016 | Oswalt | H04L 63/123 |
| 2003/0035548 A1 * | 2/2003 | Kwan | H04L 63/04 380/286 |
| 2005/0069136 A1 * | 3/2005 | Thornton | H04L 63/0823 380/277 |
| 2011/0211699 A1 | 9/2011 | Ma | |
| 2013/0212637 A1 | 8/2013 | Guccione | |
| 2013/0236019 A1 * | 9/2013 | Zaverucha | H04L 9/3263 380/278 |
| 2013/0281058 A1 * | 10/2013 | Obaidi | H04L 9/28 455/411 |

* cited by examiner

SECURE IMPORT AND EXPORT OF KEYING MATERIAL

TECHNICAL FIELD

An embodiment addresses trusted computing.

BACKGROUND

Public key encryption (asymmetric key cryptography) includes an asymmetric scheme that uses a pair of keys for encryption: the public key encrypts data, and a corresponding secret or private key decrypts it. For digital signatures, the process is reversed: the sender uses the private key to create a unique electronic number that can be read by anyone possessing the corresponding public key, which verifies that the message is truly from the sender. In contrast, a symmetric scheme (symmetric key cryptography) includes an encryption system in which the sender and receiver of a message share a single, common private key that is used to encrypt and decrypt a message. Regardless of whether symmetric or asymmetric schemes are at issue, the private key of either scheme is a key that should be held in confidence if the scheme is to effectively promote secure computing.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

Figure 1A:
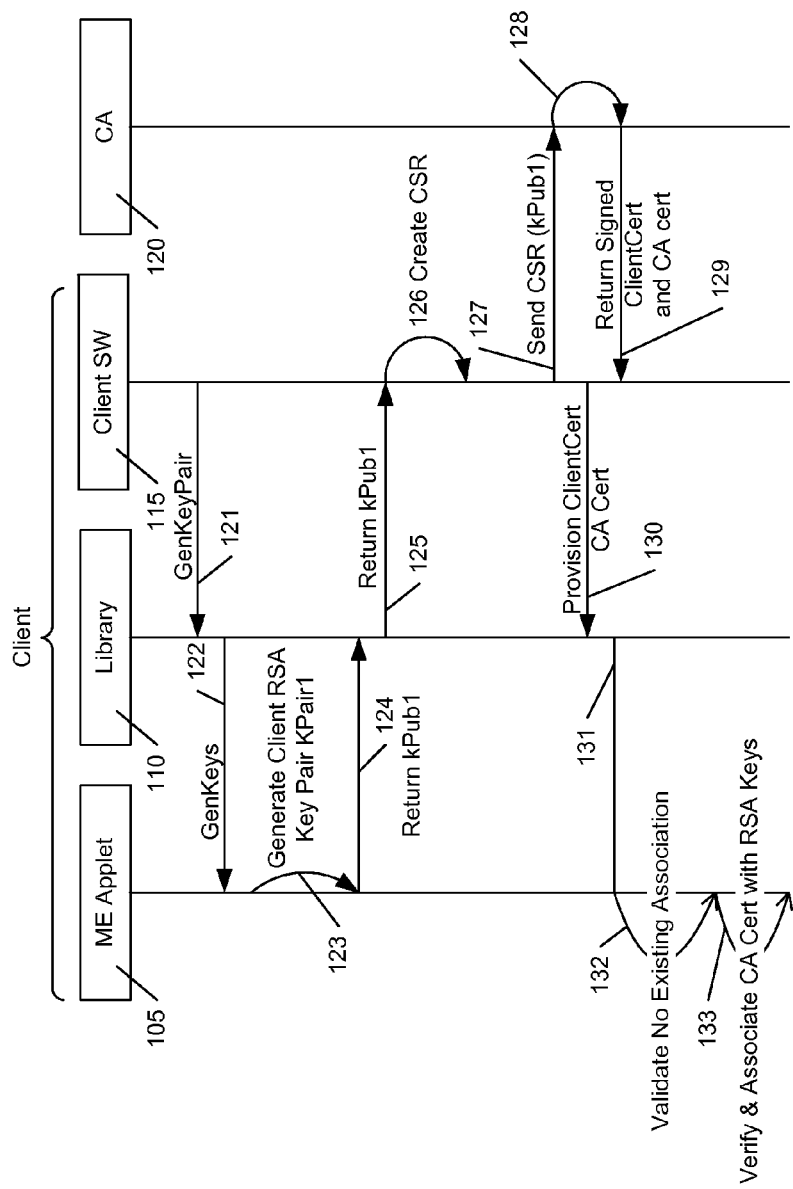
FIG. 1A includes a method of key enrollment in an embodiment of the invention.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

Key management for symmetric and asymmetric keys can be handled in a variety of ways using, for example, a hardware security module (HSM), a smart card, or a Trusted Platform Module (TPM). More specifically, a HSM is a physical computing device that safeguards and manages digital keys for authentication and provides cryptoprocessing without revealing keying material. A smart card includes a small electronic device that contains electronic memory, and possibly an embedded integrated circuit (IC) that may be used for storing cryptographic keys. A TPM is a hardware device that is a secure micro-controller with added cryptographic functionalities. It works with supporting software and firmware to prevent unauthorized access to a computer. The TPM contains a hardware engine to perform up to 2048-bit RSA encryption/decryption. The TPM uses its built-in RSA engine during digital signing and key wrapping operations. The TPM, like HSMs and smart cards, may store cryptographic keys. Smartcards, HSMs, TPMs and the like have key migration capabilities whereby they may export and/or import keys. However, the migration capabilities can be problematic.

For example, conventional migration techniques may be overly reliant upon complex hardware systems (e.g., HSM, TPM). TPMs provide the ability for secure migration of keying material but TPMs require new infrastructure elements as well as a different keying hierarchy that needs to be specifically generated/configured and used for this purpose. TPMs are not widely used in information technology (IT) deployments because of setup and provisioning hurdles associated with the modules.

As another example, conventional migration techniques may be overly reliant upon physically or manually moving the component from one trusted execution environment (TEE) to another TEE. For example, discrete Smart Cards and Secure Tokens do not provide the ability to securely export keying material generated in them. Such devices have to be physically removed and plugged into different devices/TEEs.

Manual key migration (e.g., PKCS12) is another problematic migration technique because it requires a user personal identification number (PIN) to be supplied to a key derivation function (KDF). The KDF produces a symmetric key used to wrap the user private key in a binary large object/basic large object (blob) before exporting the blob and wrapped key from a TEE. However, anyone who can learn or guess the PIN may unwrap the private key blob and frustrate secure computing efforts.

In still another example, conventional migration techniques may lack specificity in controlling the migration of keys or be lacking for any of a number of other reasons. For example, other methods support migration using a migration authority or key migration authority (MA) where the migration key is generated by the MA (a first TEE) and supplied to a second TEE at the point of key migration. However, this requires trusting the MA by the client, which in turn depends on manual or less secure provisioning protocols requiring clean-room operation (i.e., there is a risk the key security is violated at the manufacturing facility for the first TEE). Also, "virtual smart cards" like the Microsoft® Virtual Smart Card do not support secure Import/Export of keys but instead rely on a party (e.g., an information technology (IT) group of an enterprise) generating multiple certificates or credentials per user for usages that span multiple devices.

In sum, the above examples show how conventional migration methods cannot support deployment scenarios lacking a "local" deployment environment. Such a local deployment environment may include a situation where an administrator can provision trust anchors at a physical distribution point (e.g., IT headquarters). IT personnel at these IT headquarters may store several certificates on a server before releasing a Smartphone to an employee. The employee may later lose the Smartphone and, along with it, the ability to decrypt documents that were encrypted with a private key resident on the Smartphone. However, the IT personnel would have spare certificates to decrypt the materials. Other "local" options include a situation where manual key migrations are permitted or practical (e.g., manually moving smart cards from the IT department to an employee on a different floor of the same building is not too burdensome and is thus a "local" option; as opposed to a non-local option where that same employee is in a different country from the IT department, which would be a very burdensome key migration task if handled with migration of smart cards). However, these scenarios are not ideal for non-local environments whereby "remote" provisioning may be necessary. For example, these situations are not ideal for a user purchasing a Smartphone in Asia that wants to transfer private certificates to an IT department located in South America.

An embodiment of the invention addresses key migration (export and/or import) using a secure computing environment.

FIG. 1A includes key enrollment in an embodiment of the invention. FIG. 1A shows a key enrollment protocol where a user's asymmetric key pair is created and enrolled into an administrative domain such as a corporation or business (enterprise). More specifically, the process includes (1) generation of a user key pair by a client, (2) creation of a Certificate Signing Request (CSR), (3) enrollment of the user's public key with an MA (such as a certificate authority (CA)) using the CSR, and (4) creation of the certificate including the public key and returning the newly formed certificate to the client (which is optional and does not occur in some embodiments).

A more detailed discussion now follows. In an embodiment, key pair generation occurs using a client and a CA. A CA can act or function as an MA and the two terms are sometimes used interchangeably herein. The CA 120 may be a server or servers run by an organization's/enterprise's IT department to store backup keys from various clients. The client may include a library 110, management engine (ME) code such as an ME applet 105, and a client software (SW) utility 115 ("client SW") that is "above" the library 110 in terms of operability.

In an embodiment, the client is included in a TEE. A TEE is a secure area that resides in the application processor of an electronic device. More specifically, a TEE has hardware based security due to hardware based isolation of the TEE from in-band components such as an operating system (OS). Software and cryptographic isolation provide further protection for the TEE. Separated by hardware from the main OS, a TEE ensures the secure storage and processing of sensitive data and trusted applications. The TEE protects the integrity and confidentiality of, for example, certain private keys stored or processed within the TEE. A TEE manages and executes trusted applications built in by device makers as well as trusted applications installed as people demand them. Trusted applications running in a TEE have access to the power of a device's main processor and memory, while hardware isolation protects these applications from user installed applications running in the main OS. Software and cryptographic isolation inside the TEE protect the trusted applications contained within from each other. Device and chip makers use TEEs to build platforms that have trust built in from the start, while service and content providers rely on integral trust to start launching services and new business opportunities. Examples of a TEE include Intel Corporation's (Intel®) Management Engine (ME), Intel® Software Guard Extensions (SGX) technologies (Secure Enclaves), and the like. A TEE is sometimes referred to herein as a secure processor that operates out-of-band from a main processor of a computing node.

Regarding secure enclaves, a secure enclave is a TEE that prevents software executing outside the enclave from having access to software and data inside the enclave. Various embodiments of secure enclaves are described in, for example, the U.S. patent application entitled "Method and Apparatus to Provide Secure Application Execution", filed Nov. 13, 2009 (Ser. No. 12/590,767); the PCT Patent Application entitled "Method and Apparatus to Provide Secure Application Execution", filed Dec. 22, 2009 (Application No. PCT/US2009/069212); and the U.S. patent application entitled "System and Method for Implementing a Trusted Dynamic Launch and Trusted Platform Module (TPM) Using Secure Enclaves", filed Dec. 22, 2010 (Ser. No. 12/976,831).

Returning to FIG. 1, at elements 121, 122 the client SW makes a call (GenKeyPair) and library 110 makes a call (GenKeys) to the ME applet 105 to generate a Rivest, Shamir, and Adelman (RSA) key pair "KPair1" based on the calls. At element 123 the KPair1 is created as an exportable or "archiveable" key pair with an appropriate flag set in its properties. The flag settings for keys will be addressed in greater detail below. The public key (Kpub1) of KPair1 is returned to the library 110 (element 124) and then to the client SW 115 (element 125), after it is generated in the ME applet 105 (element 123). The client software 115 will then create a CSR (element 126) that includes the KPub1 and send this message (element 127) to CA 120 for signing (element 128). The CSR may include a format corresponding to, for example, PKCS10. After doing so a certificate chain includes a root certificate whereby CA 120 provides its own certificate (CACert, which is a "root" certificate from the "root" CA) with its own public key and an additional certificate (ClientCert) signed by CA 120 and including KPub1. The certificate chain based on the KPub1 is then returned through the client to ME applet (elements 129, 130, 131). The KPub1 at this point can be used as part of the ClientCert for different usages such as a virtual private network (VPN) inside the enterprise corresponding to CA 120.

At element 132 the ME applet 105 will check to see that KPair1 is not already associated with a CA certificate. If it is not already associated with another CA certificate, in element 133 ME Applet 105 will validate that ClientCert is indeed part of the certificate chain. Once this validation is successfully completed, in element 133 the ME applet will create an association between KPair1 and the CAcert. At this point the key pair generation is complete and, as will be discussed below, the KPriv1 (the private key of KPair1) may be exported in a secure and target specific way (e.g., to CA 120 but not to any other CA).

In an embodiment, the ME applet 105 may determine whether the CACert contains any CA public key (CAPub1) or other certification as part of its properties. If the CACert contains a CA certificate including a public key, that certificate and public key are associated with the KPair1 as well.

The above described certificate provisioning may occur for every key pair that is generated and that is exportable or "archiveable".

While in the above example regarding FIG. 1A the Client received a copy of the certificate ClientCert, doing so is not required in all embodiments. Neither is it necessary for the client to validate the newly minted certificate (element 132). If the client is expected to receive certificates issued to a second client, then the first client must be provisioned with a "trust anchor" (e.g., the CACert that is a root certificate or root of trust certificate) that allows termination of certificate path validation (i.e., that corresponds with the certificate to be received). Trust anchor provisioning can be a challenge in terms of security and in terms of minimizing deployment costs. Trust anchors are a hash of a public key. This information is implicitly trusted. In other words, it is treated like a symmetric secret. It must be provisioned over a secure/out of band channel. This can be a bootstrapping problem because an assumption of public key infrastructure is the public keys are used to wrap symmetric keys that are then used to create secure channels. So there is a circularity. Avoiding the circularity is a primary objective in practical deployments. In an embodiment the trust anchor corresponds to the certificate for the second client. Thus, the association is provisioned between the first and second clients. This provisioning may occur locally (e.g., at IT headquarters whereby the IT personnel provision the trust anchor manually into the device before giving the device to the employee).

Additionally, the roles of certificate issuance and key migration may be subject to a "least privilege" operation where different services and administration processes apply. For example, the HR department may maintain sensitive information that should not be exposed to the Engineering department. They may employ departmental MA services to prevent possible cross migration issues. Consequently, it may be necessary to provision separate trust anchors for separate MAs. Thus, the process of FIG. 1A may be repeated to link different private keys of the client to different CAs.

Figure 1B:
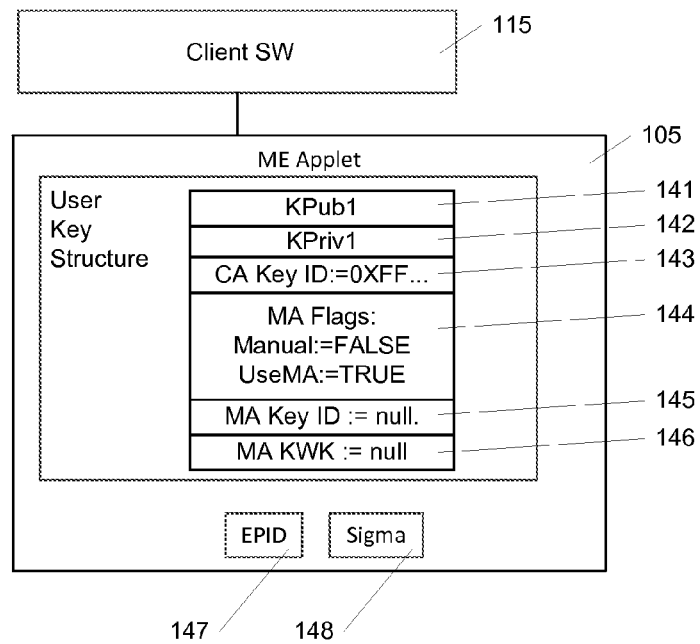
FIG. 1B includes an example of a key with flags in an embodiment of the invention.

FIG. 1B includes an example of a key with flags in an embodiment of the invention. Client SW 115 (at times herein library 110 and ClientSW 115 are depicted solely as ClientSW as was done in FIG. 1B) couples to ME Applet 105. The key structure includes many elements. Elements 141, 142 include the KPub1 and the corresponding private key KPriv1 that were created in element 123 of FIG. 1A. Element 143 includes the "association" addressed in element 133 of FIG. 1A. The "association" associates this KPair1 with a particular CA's certificate (such as the public key associated with CACert). Various flags are included in an embodiment. Element 144 includes several MA related flags. If the flag is such that "Manual=False" then this indicates manual key migration (see FIG. 4) is not permitted. If another flag indicates "UseMA=True" then this indicates migration to an approved CA, such as the one identified in block 143, is allowed. This type of migration is "non manual" and is described in FIGS. 2 and 3.

Element 145 indicates no MA related public key (such at CAPub1 discussed above) is presently affiliated with KPair1. Also, element 146 indicates no key for wrapping other keys (addressed more in FIGS. 2-4) is associated with KPair1. Due to the assignment in element 143, any attempt by a subsequent CA to associate itself with KPair 1 will fail.

The scheme of FIGS. 1A and 1B may be referred to as a "first-come-first-served (FCFS)" strategy with a TEE whereby, as described above, the first CA to establish a correspondence with the first client public key is the only CA that will be allowed to make such a correspondence. This scheme of trust anchor (root certificate) provisioning (i.e., from CA 120) supports deployment scenarios where a client does not have a priori trust relationships with a specific vendor, is not in a deployment environment where an administrator can provision trust anchors at a local environment (see discussion above regarding IT headquarters, etc.), or where manual key migrations are not permitted or practical. Subsequent key/certificate provisioning attempts will fail implying the first entity to provision was authorized. If a rogue entity happens to provision first, and a second legitimate entity later attempts to provision then the desired legitimate provisioning attempt will fail. However, the second provisioning attempt may manually reset the provisioning state to factory defaults and attempt the provisioning again. The reset requires privilege. In an embodiment this requires physical access to the device. If the attacker is malware then the attacker does not have physical access to the device and cannot maliciously reset the provisioning state. Also, after first provisioning re-provisioning requires authentication using the provisioned credentials. So an attacker does not have these provisioned credentials if the device was first successfully provisioned. This is another layer of defense against attackers. Also, if the attacker "gets there first" (i.e., executes the first provisioning on the device) then, in an embodiment, the legitimate owner cannot provision and is denied service. So it is a denial of service attack. In such a case the owner may need to manually reset and re-provision the device. But that is how it is done today. So this is an improvement.

As shown in FIG. 1B, the TEE ME Applet includes an EPID key (147) and sign and message authentication code (Sigma) session support (148) for establishing a secure but anonymous channel to a provisioning service such as CA 120. The Sigma session prevents a class of attacks orchestrated from software. With Sigma the only attacks are man-in-the-middle (MITM) attacks using valid TEE code. Such a scenario makes it much harder to be a successful attacker without first compromising the endpoints. Given an assumption of secure endpoints the provisioning steps can bootstrap (create/provision) the other keys that are the unique identifiers for the endpoint. From that point forward the endpoint can be authenticated repeatedly and credential lifecycles can be managed securely in terms of refreshing the keys or re-issuing credentials.

The provisioning servers can verify that the TEE is trustworthy using EPID attestation of the TEE such that the success or failure response can be trusted. The session may be based on a shared session key such as the session key addressed in more detail below regarding element 225 of FIG. 2A. By way of example, upon their mutual authentication the client and CA may execute a SIGMA protocol or another suitable protocol for establishing the shared wrapping session key. In any case, the session key may be ephemeral or permanent. If ephemeral the session key may remain valid for a set number (e.g., 1, 2, etc.) of sessions or for a set time period, after which a new session key may be needed. In any case the client and CA may use the session key to encrypt messages to one another while the secure session is active. Although the use of a SIGMA protocol to generate and use a session key is one suitable mechanism for establishing a secure session, other mechanisms may also be used and are envisioned by the present disclosure.

Figure 1C:
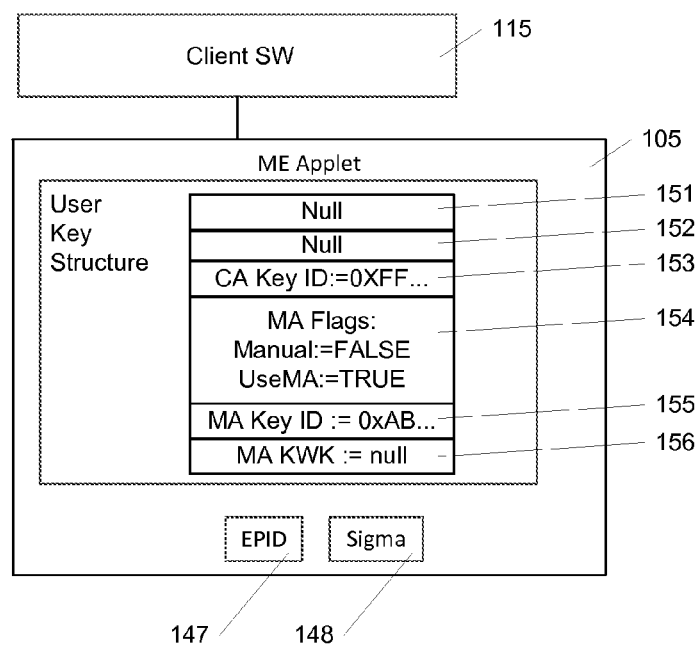
FIG. 1C includes an example of a key with flags in an embodiment of the invention.

As mentioned above, a CA can function as an MA. In this case, as seen in FIG. 1B, element 145 may be set to "null" so that reliance is on the CA (element 143) for export of the KPriv1. However, the CA can also delegate identification responsibilities to a different MA. For example, in FIG. 1C the ME applet 105 again couples to Client SW 115 and has EPID and Sigma elements for private or secure channel building with a CA or MA. The key structure again includes many elements. Elements 151, 152 will eventually (explained further below) include the KPub1 and the corresponding private key KPriv1 that will be created in element 123 of FIG. 1A at a later time. Element 153 includes the "association" to a CA addressed in element 133 of FIG. 1A. The "association" associates this KPair1 with a particular CA's certificate (such as the public key associated with CACert). Various flags are included in an embodiment as they were in FIG. 1B. Unlike FIG. 1B, in FIG. 1C element 155 indicates an MA related public key (such at MAPub1) is presently affiliated with KPair1. Thus, the CA has designated an MA to serve as a trusted entity for future migration needs. While FIG. 1C shows a single CA to MA delegation in other embodiments one or more CAs may designate authority to one or more MAs. For example, a very large corporation may have a general CA server that then designates to various MA servers that correspond to various subsidiaries of the large corporation. Due to the assignment in element 153 and 155, any attempt by a subsequent CA or MA to associate itself with KPair 1 will fail.

Thus, if FIG. 1B refers to a general "first-come-first-served" strategy FIG. 1C includes an embodiment that may be used in a "build-to-order" trust anchor provisioning scheme that inputs CA and MA trust anchors. Those trust anchors are supplied by trusted solution providers delivering a pre-provisioned platform customized with a vendor specific CA solution. A vendor's MAPub1 trust anchor and optionally the vendor's key wrapping key (KWK) may be pre-provisioned to the client at a factory. A profile for construction of key structures suitable for the vendor may also be generated at manufacturing time. Key generation operations may occur at a later time in the field and may specify a vendor specific key generation mode that uses the pre-provisioned key structures (fields 155, 156). This explains why fields 151, 152 are set to null in FIG. 1C as they have not yet been provisioned. However, the KPair1 may be built before fields 155 and/or 156 are populated in other embodiments.

Figure 2A:
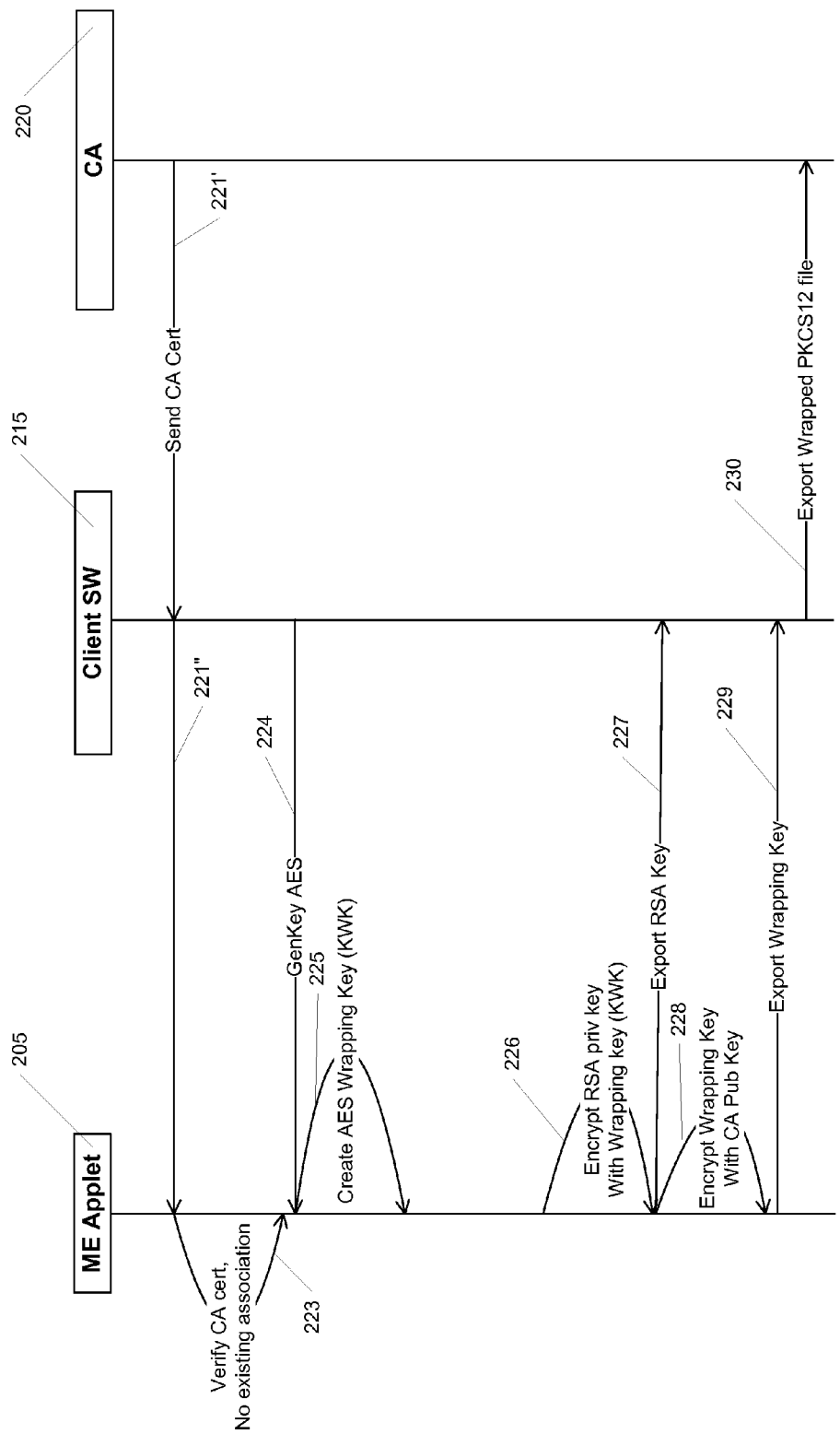
FIG. 2A includes a method of key exporting in an embodiment of the invention.

FIG. 2A includes a process for key exportation in an embodiment of the invention. The CA 220 public key (CAPub1), included within the CA cert, is imported into the client SW 215 (element 221') and then into the ME applet 205 (element 221"). This CA Cert transfer may occur when the client or CA wish to commence KPriv1 exportation. The library and client software were illustrated independently in FIG. 1A (see elements 110, 115) but are illustrated collectively in FIGS. 2, 3, and 5.

In element 223 the ME applet will validate that the public key from CA cert matches the CA public key that was previously associated with the KPair1 in FIG. 1A. If validation is successful Client SW 215 will make a call to generate an AES Wrapping key (referred to herein as KWK) in the ME applet (element 224). The KWK is made in element 225. In element 226 the KWK is used to encrypt the KPriv1 in a blob. In element 227 the encrypted KPriv1 is exported to client SW 215. The Client SW 215 makes a call to the ME applet 205 to encrypt the KWK with the CAPub1, which occurs in element 228. The wrapped wrapping key is returned to the Client SW 215 (element 229). The Client SW 215 will package the wrapped key blob and wrapped KWK into a PKCS12 file format and export the same to the CA 220 server (element 230). As a result the CA may unwrap the KWK and rewrap the user's private key (KPriv1) to facilitate migration to a new user device (not yet available to the domain) or the CA may retain the private key in the wrapped key blob to be imported to a second user TEE where the second user TEE import key has been obtained and supplied to the first user TEE to wrap the user private key.

Figure 2B:
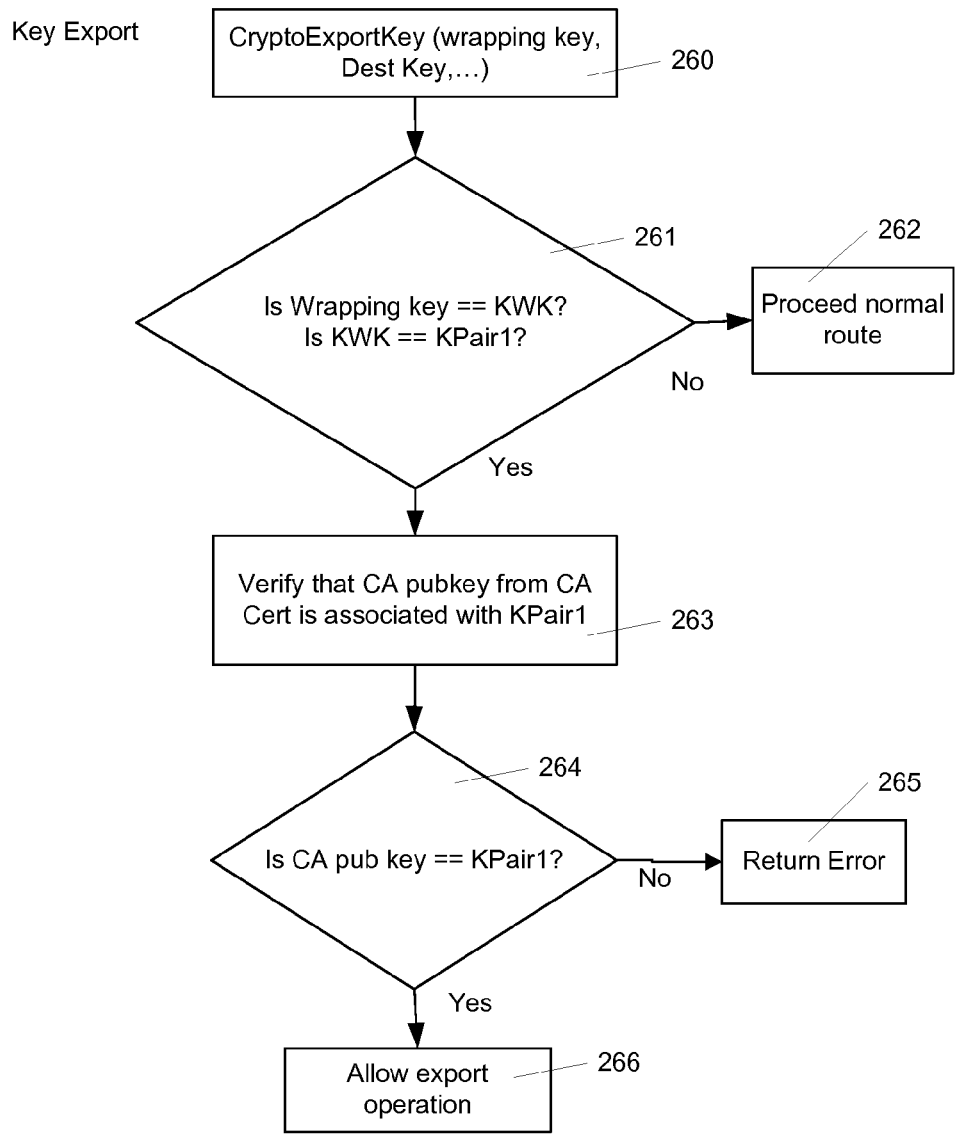
FIG. 2B includes a method of key exporting in an embodiment of the invention.

FIG. 2B includes a method of key exporting in an embodiment of the invention. In FIG. 2B block 260 includes a call to export KPriv1. In block 261 a determination is made regarding whether KWK is present in element 156 (is wrapping key==KWK) and whether KWK is associated with the KPriv1 that is being requested (is KWK==key pair). If not, the process may proceed according to FIG. 2B. However, if yes then in block 263 a call is made so the ME applet will validate that the public key from CA cert matches the CA public key that was previously associated with the KPair1 in FIG. 1A. This validation occurs in block 264. If there is no such association then an error is returned in block 265. However, if there is an association then exportation of KPriv1 occurs in block 266.

Figure 3:
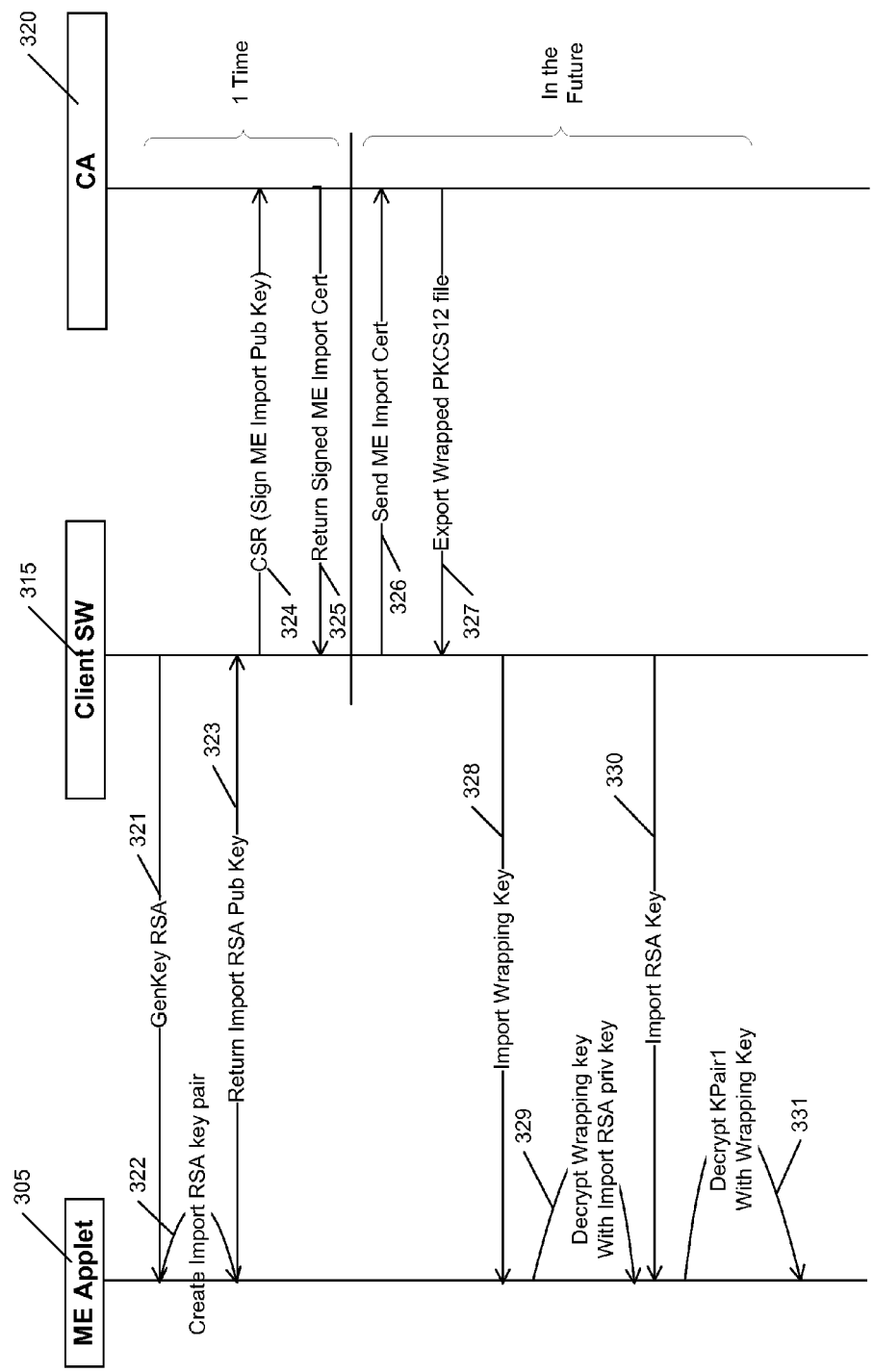
FIG. 3 includes a method of key importing in an embodiment of the invention.

FIG. 3 includes a process for key importation in an embodiment of the invention. The Client SW 315 needs to create a key importation certificate "ImportCert" and send the certificate to the CA server 320 from which the RSA keying material needs to be imported. To that end, in element 321 the Client SW 315 will make a call to the ME applet 305 to generate an RSA key pair for key importation ("KPair2"). This KPair2 (generated in element 322) is different from the KPair1 discussed above. The public key portion ("KPub2") portion of KPair2 is returned to the Client SW 315 (element 323). The Client SW 315 will create a CSR (Certificate Signing Request) based on the KPub2 and send this message to the CA server 320 (element 324) for signing with the CA cert. In an embodiment the CSR is signed using Intel® Enhanced Privacy ID ("EPID") so the CA server can attest to the key-pair being generated by hardware (e.g., the Intel® ME). The ImportCert (based on the KPub2) is then returned to the client (element 325). In an embodiment elements 321-325 are a one-time operation that happens in a secure IT environment and the ImportCert is used for all future key imports on the client.

Later (possibly months or years after element 325 has occurred) when the client is triggered to perform a secure import operation, the client will send the ImportCert to the CA server 320 from which the RSA keying material (KPair1) needs to be imported (element 326). The CA server (which may be a server including backups of encryption keys) will authenticate the client. For example, the CA server will determine that the ImportCert is a valid certificate issued by the CA and then use the ImportCert public key (KPub2) to encrypt the RSA keying material (KPair1) into a PKCS12 file. The PKCS12 file is then sent to the client platform (element 327). The Client SW 315 will make a call to import the wrapping key of the PKCS12 file (element 328) and the wrapped RSA key pair (KPair1) PKCS12 file (element 330) into the ME applet 305. The ME applet 305 will decrypt the wrapped wrapping key and the wrapped KPair1 based on the ImportCert private key (elements 329, 331).

The flow of FIG. 3 shows how migration of a private key, held in a trusted MA (such as the Ca), is imported into a client TEE. In an embodiment the client TEE trusts that the CA did not use the private key while in the CA. In an embodiment the client TEE may trust that if duplicate copies of the private key (Kpriv1) is not permitted by the TEE key policy, that the CA removed its copy of the user private key as part of the import operation of FIG. 3.

Figure 4:
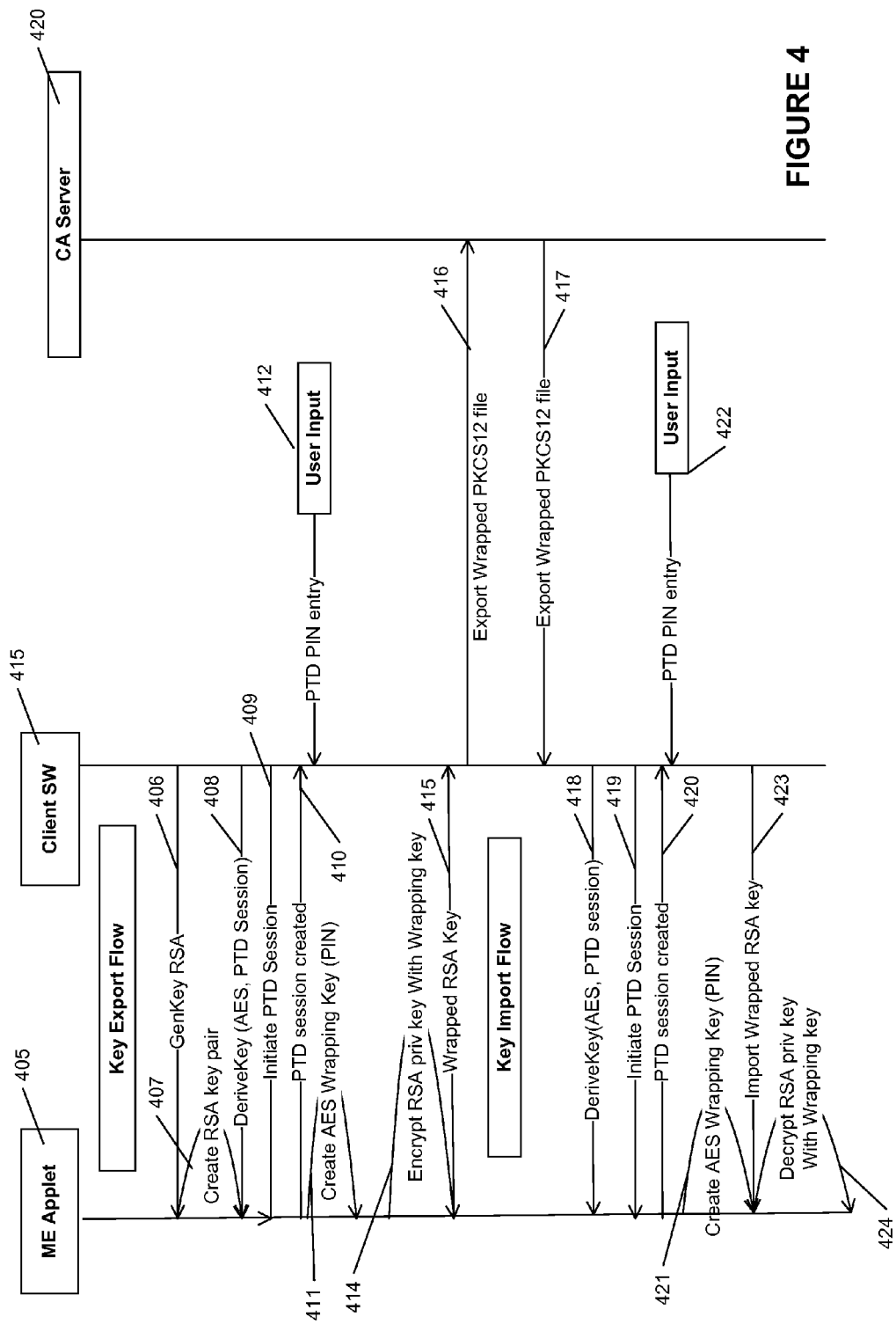
FIG. 4 includes a method of manual key exporting and importing in an embodiment of the invention.

FIG. 4 includes a process for key exportation and key importation in an embodiment of the invention. This embodiment differs from the embodiments previously described.

During a key export operation, in element 406 the Client SW 415 issues a call to the ME applet 405 to generate a key pair. In element 407 the key pair (KPair1) is generated. The ME applet will initiate/create a plain text domain (PTD) session with the ME applet using a call (element 408), which is followed by implementation of the session (elements 409, 410). In element 412 the user will be prompted to enter a PIN. The user PTD PIN entry will be captured and passed to the ME applet (not shown) and the ME applet will use this PIN to derive an AES wrapping key using a PKCS5 password based key derivation function (PBKDF) (element 411). In an embodiment the PIN is entered through a secure output, such as Intel IPT-PTD. In element 414 the ME applet will use this AES key to wrap the RSA private key (KPriv1) for export and then, in element 415, communicate the wrapped RSA key to the Client SW 415. The Client SW 415 will package the wrapped key blob into a PKCS12 file format and export the same to the CA server 420 (element 416).

During a key import operation the PKCS12 file with the encrypted keying material (KPair1) is sent to the client platform from the CA server (element 417). The ME applet will initiate/create a PTD session with the ME applet using a call (element 418), which is followed by implementation of the session (elements 419, 420). The user PTD PIN entry (e.g., using Intel IPT-PTD) will be securely captured (element 422) and passed to the ME applet (not shown). The ME applet will use this PIN to derive an AES wrapping key using PKCS5 PBKDF (element 421). The ME applet will import the wrapped RSA key pair KPair1 (element 423). The ME applet will use the AES wrapping key (derived from the user PIN in element 421) to decrypt the RSA key pair KPair1 (element 424). The RSA key pair is now securely imported and ready for use. In an embodiment, the PIN is but one factor used to restore a key (i.e., have the private key imported to the ME Applet after it was originally exported from the ME Applet). For example, in an embodiment a user will need to know the PIN but will also have to prove to his or her identity to the CA/MA. This proof may be based on a hash shared between the user and the CA/MA, a signature or certificate from the user that is to be vetted by the CA/MA, and the like. One example of such a scenario was describe with regard to element 326 of FIG. 3, although other embodiments are not so limited.

Thus, FIG. 4 shows manual key migration using a PIN obtained through a trusted input path. The user input is provided via a trusted input path (e.g., PTD) to the TEE containing the user key to be migrated (KPriv1). The user key structure migration flags indicate if manual migration is authorized (see element 144 of FIG. 1B).

PKCS12, mentioned above with regard to FIG. 4, is an existing method for manual migration where authorization is presumed given knowledge of a user chosen password that is used to then derive a symmetric key (such as with AES) using a KDF. PKCS12 defines a KDF but others have also been defined. An embodiment improves upon PKCS12 in several ways. First, user prompts for performing manual key migration are authorized using migration bits (e.g., element 144) in the key structure. If the manual migration flag is not set, then the user cannot be prompted to enter a manual migration passphrase. Second, user prompts for passwords/PINs uses a trusted input path mechanism such as Intel IPT-PTD (a form of PTD) which establishes a method for entering a PIN that is hidden from malware observation within the client host software stack. Third, a PKCS12 wrapping key (see element 416) is generated using a TEE random number (rather than derived from a password) and provisioned to a second TEE using a migration authority key pair. This requires provisioning of a CA public KWK.

Thus, embodiments described herein provide numerous benefits such as: (1) use of migration authorization flags in the private key structure for specifying permissible key migration policies, including manual and CA assisted migrations, (2) CA trust anchor (CA root certificate) provisioning using EPID and Sigma channels to implement first-come-first-served provisioning for products already released into the field and no longer retrained within a constrained environment such as a manufacturing facility; (3) build-to-order provisioning involving CA vendor provided trust anchors (see FIG. 2c); (4) Trusted path PIN entry for manual key migrations (see FIG. 4); (5) overloading of certificate enrollment protocols for provisioning of CA trust anchors and KWK values; (6) migration of private keys to a trusted MA (e.g., trusted 3rd party) or migration of keys from a first TEE to a second TEE without use of a trusted 3rd party; (7) OS agnostic methods for doing the aforementioned key provisioning and migration; (8) authentication of user performing migrations for both manual and automated methods where user approval is obtained through a trusted input path to the TEE; (9) the ability to work with existing enterprise IT infrastructure for PKI without requiring the deployment of infrastructure elements such as TPMs; (10) the ability to attest a TEE; and (11) protect a user key structure inside a TEE.

Regarding item (5) immediately above, in greater detail this refers to several embodiments, one of which uses a PKCS10 certificate enrollment message where, for example, an X.509v3 extension may be used to include additional information in a certificate. The extension may contain trust anchors besides the issuing CA trust anchor and public keys not directly related to the issuing CA trust anchor. These trust anchors and public keys may be used during future key exchanges.

Regarding item (6) and "without use of a trusted 3rd party" addressed immediately above, in greater this refers to an embodiment related to FIG. 4 whereby the CA principal (element 420) is not a trusted-3rd party but fills a role of storage and communication of the wrapped PKCS12 file (elements 416, 417).

Embodiments provide a solution for secure import and export of hardware protected RSA keys with PKI. Embodiments extend the usage of PKI technology to secure file sharing and secure cloud storage scenarios. Conventional systems do not allow secure import or provisioning of an RSA key pair and does not allow secure export of an RSA key pair generated with hardware (e.g., within a hardware based ME). This restricts the usage of previous private keys to a single device, does not allow the secure key pair to be shared securely across multiple devices, and also restricts archival of the key pair by enterprise IT. Embodiments provide a novel solution to address these shortcomings and allow secure import and export of hardware protected RSA keys with PKI based schemes. These keys are hardware protected because, in some embodiments, they are managed within Secure Enclaves (which are hardware based) and do not leave the Secure Enclave "in the open" (unencrypted). Embodiments provide the ability to attest keying material based on ME hardware, and without reliance on software based keys. Further, embodiments combine the flexibility of software based key material protection solutions with the security of hardware based protection. Embodiments integrate at the platform level and do not require discrete hardware and the cost associated with discrete hardware tokens.

Thus, as shown above embodiments cover a variety of possible deployment options. Embodiments cover generated, derived, and pre-provisioned keys. Generated keys have strong entropy properties but may require bootstrapping from a Sigma/EPID session, which is subject to denial-of-service attacks and some MITM attacks. Derived keys may rely on a human supplying a PIN/PASSWORD that has acceptable levels of entropy but presumes humans can pick and remember PINS well. Such derived keys may be subject to brute force cryptographic and denial-of-service attacks. Pre-provisioned scenarios build on the trust that the supply chain isn't compromised. A build-to-order system could pre-provision keys providing a service to the customer at the risk of a supply chain integrity being breached. Thus, various embodiments are covered herein.

Either of the client or CA nodes discussed herein may utilize a system such as the system of FIG. 5, discussed below. In fact, embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

Figure 5:
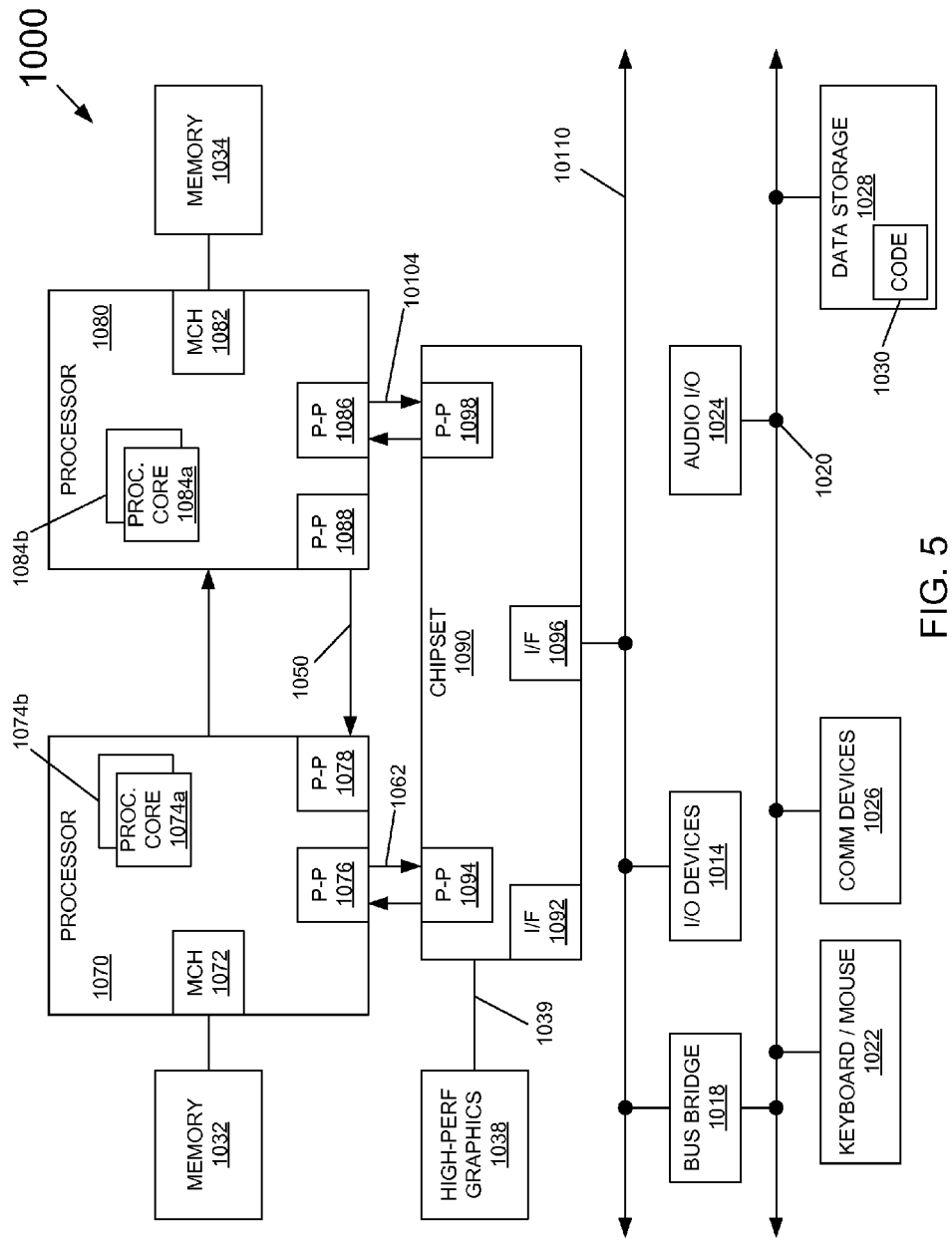
FIG. 5 includes a system for use with an embodiment of the invention.

Referring now to FIG. 5, shown is a block diagram of a system embodiment 1000 in accordance with an embodiment of the present invention. System 1000 may be included in, for example, a mobile computing node such as a cellular phone, smartphone, tablet, Ultrabook®, notebook, laptop, personal digital assistant, and mobile processor based platform.

Shown is a multiprocessor system 1000 that includes a first processing element 1070 and a second processing element 1080. While two processing elements 1070 and 1080 are shown, it is to be understood that an embodiment of system 1000 may also include only one such processing element. System 1000 is illustrated as a point-to-point interconnect system, wherein the first processing element 1070 and second processing element 1080 are coupled via a point-to-point interconnect 1050. It should be understood that any or all of the interconnects illustrated may be implemented as a multi-drop bus rather than point-to-point interconnect. As shown, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to methods discussed herein.

Each processing element 1070, 1080 may include at least one shared cache. The shared cache may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discrete logic outside the processing elements 1070, 1080 rather than integrated therein.

First processing element 1070 and second processing element 1080 may be coupled to an I/O subsystem 1090 via P-P interfaces 1076, 1086 via P-P interconnects 1062, 10104, respectively. As shown, I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components.

In turn, I/O subsystem 1090 may be coupled to a first bus 10110 via an interface 1096. In one embodiment, first bus 10110 may be a Peripheral Component Interconnect (PCI) bus, or a bus such as a PCI Express bus or another third generation I/O interconnect bus, although the scope of the present invention is not so limited.

As shown, various I/O devices 1014, 1024 may be coupled to first bus 10110, along with a bus bridge 1018 which may couple first bus 10110 to a second bus 1020. In one embodiment, second bus 1020 may be a low pin count (LPC) bus. Various devices may be coupled to second bus 1020 including, for example, a keyboard/mouse 1022, communication device(s) 1026 (which may in turn be in communication with a computer network), and a data storage unit 1028 such as a disk drive or other mass storage device which may include code 1030, in one embodiment. The code 1030 may include instructions for performing embodiments of one or more of the methods described above. Further, an audio I/O 1024 may be coupled to second bus 1020.

Note that other embodiments are contemplated. For example, instead of the point-to-point architecture shown, a system may implement a multi-drop bus or another such communication topology. Also, the elements of FIG. 5 may alternatively be partitioned using more or fewer integrated chips than shown in the FIG. 5.

Example 1 includes a method executed by at least one processor of a first computing node comprising: generating a key pair including a first public key and a corresponding first private key; receiving an instance of a certificate, including a second public key, from a second computing node located remotely from the first computing node; associating the instance of the certificate with the key pair; receiving an additional instance of the certificate; verifying the additional instance of the certificate is associated with the key pair; and encrypting and exporting an instance of the first private key in response to verifying the additional instance of the certificate is associated with the key pair.

In example 2 the subject matter of Example 1 can optionally after associating the instance of the certificate with the key pair, receiving another certificate that is not another instance of the certificate; and attempting but failing to verify the another certificate is associated with the key pair.

In example 3 the subject matter of Examples 1-2 can optionally include rejecting exporting an additional instance of the first private key in response to attempting but failing to verify the another certificate is associated with the key pair.

In example 4 the subject matter of Examples 1-3 can optionally include receiving a request to export the additional instance of the first private key; and rejecting exporting the additional instance of first private key in response to receiving the request to export the additional instance of first private key.

In example 5 the subject matter of Examples 1-4 can optionally include receiving another certificate that is not another instance of the certificate; verifying the another certificate is associated with the key pair; and encrypting and exporting an additional instance of the first private key in response to verifying the another certificate is associated with the key pair.

In example 6 the subject matter of Examples 1-5 can optionally include storing a first identifier, which corresponds to the instance of the certificate, in at least one memory coupled to the at least one processor; and storing a second identifier, which corresponds to the another certificate, in the at least one memory.

In example 7 the subject matter of Examples 1-6 can optionally include generating an additional key pair including an additional first public key and a corresponding additional first private key; receiving an instance of an additional certificate including an additional second public key; associating the instance of the additional certificate with the additional key pair; receiving an additional instance of the additional certificate; verifying the additional instance of the additional certificate is associated with the additional key pair; and encrypting and exporting an instance of the additional first private key in response to verifying the additional instance of the additional certificate is associated with the additional key pair.

In example 8 the subject matter of Examples 1-7 can optionally include verifying the first computing node allows exportation of the first instance of the first private key; and exporting the first instance of the first private key in response to verifying the first computing node allows exportation of the first instance of the first private key.

In example 9 the subject matter of Examples 1-8 can optionally include wherein verifying the first computing node allows exportation of the first instance of the first private key includes reading a flag status.

In example 10 the subject matter of Examples 1-9 can optionally include after associating the instance of the certificate with the key pair, receiving multiple additional certificates of which none are another instance of the certificate; and rejecting exporting an additional instance of the first private key in response to associating the instance of the certificate with the key pair and receiving the multiple additional certificates.

In example 11 the subject matter of Examples 1-10 can optionally include receiving a request to export an additional instance of the first private key; and rejecting exporting the additional instance of the first private key in response to receiving the request to export the additional instance of the first private key.

In example 12 the subject matter of Examples 1-11 can optionally include generating a wrapping key in response to verifying the additional instance of the certificate is associated with the key pair; and encrypting the instance of the first private key with the wrapping key.

In example 13 the subject matter of Examples 1-12 can optionally include associating a wrapping key with the key pair; and encrypting the instance of the first private key with the wrapping key in response to associating the wrapping key with the key pair.

In example 14 the subject matter of Examples 1-13 can optionally include receiving a personal identification number (PIN); determining a wrapping key in response to receiving the PIN; and encrypting the instance of the first private key with the wrapping key.

In example 15 the subject matter of Examples 1-14 can optionally include receiving an additional instance of the PIN; determining an additional instance of the wrapping key in response to receiving the additional instance of the PIN; and decrypting an additional instance of the first private key with the additional instance of the wrapping key.

In example 16 the subject matter of Examples 1-15 can optionally include generating a certificate request that is coupled to the first public key; wherein (a) the instance of the certificate is coupled to a certificate chain that includes a certificate including the first public key, and (b) the second computing node corresponds to at least one of a certificate authority (CA) and a migration authority (MA); verifying the certificate chain; and associating the instance of the certificate with the key pair in response to verifying the certificate chain.

In another example the subject matter of Examples 1-15 can optionally include at least one machine readable medium comprising a plurality of instructions that in response to being executed on a computing device, cause the computing device to carry out a method according to any one of examples 1 to 15. In another example the subject matter of Examples 1-15 can optionally include an apparatus comprising means for performing any one of examples 1 to 15.

Example 17 includes at least one memory; at least one processor, included in a first computing node and coupled to the memory, to perform operations comprising: generating a key pair including a first public key and a corresponding first private key; receiving an instance of a certificate, including a second public key, from a second computing node located remotely from the first computing node; associating the instance of the certificate with the key pair; receiving an additional instance of the certificate; verifying the additional instance of the certificate is associated with the key pair; and encrypting and exporting an instance of the first private key in response to verifying the additional instance of the certificate is associated with the key pair.

In example 18 the subject matter of Example 17 can optionally include wherein the operations comprise: after associating the instance of the certificate with the key pair, receiving another certificate that is not an another instance of the certificate; attempting but failing to verify the another certificate is associated with the key pair; and rejecting exporting an additional instance of the first private key in response to attempting but failing to verify the another certificate is associated with the key pair.

In example 19 the subject matter of Examples 17-18 can optionally include wherein the operations comprise: receiving a request to export an additional instance of the first private key; and rejecting exporting the additional instance of the first private key in response to receiving the request to export the additional instance of the first private key.

In example 20 the subject matter of Examples 17-19 can optionally include wherein the operations comprise: receiving another certificate that is not an another instance of the certificate; verifying the another certificate is associated with the key pair; and encrypting and exporting an additional instance of the first private key in response to verifying the another certificate is associated with the key pair.

In example 21 the subject matter of Examples 17-20 can optionally include wherein the operations comprise: verifying the first computing node allows exportation of the instance of the first private key; and exporting the instance of the first private key in response to verifying the first computing node allows exportation of the instance of the first private key.

In example 22 the subject matter of Examples 17-21 can optionally include wherein the operations comprise: after associating the instance of the certificate with the key pair, receiving multiple additional certificates of which none are another instance of the certificate; and rejecting exporting an additional instance of the first private key in response to associating the instance of the certificate with the key pair and receiving the multiple additional certificates.

In example 23 the subject matter of Examples 17-22 can optionally include wherein the operations comprise: generating a certificate request that is coupled to the first public key; wherein (a) the instance of the certificate is coupled to a certificate chain that includes a certificate including the first public key, and (b) the second computing node corresponds to at least one of a certificate authority (CA) and a migration authority (MA); verifying the certificate chain; and associating the instance of the certificate with the key pair in response to verifying the certificate chain.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. An apparatus comprising:
at least one memory coupled to a processor;
at least one secure processor that is included in a first computing node, coupled to the memory, and out-of-band from the processor; the at least one secure processor to perform operations comprising:
generating a key pair including a first public key and a corresponding first private key;
receiving an instance of a certificate, including a second public key, from a second computing node located remotely from the first computing node;
associating the instance of the certificate with the key pair;
receiving an additional instance of the certificate;
verifying the additional instance of the certificate is associated with the key pair; and
encrypting and then exporting an instance of the first private key in response to verifying the additional instance of the certificate is associated with the key pair.

2. The apparatus of claim 1, wherein the operations comprise:
after associating the instance of the certificate with the key pair, receiving another certificate that is not an another instance of the certificate;
attempting but failing to verify the another certificate is associated with the key pair; and
rejecting exporting an additional instance of the first private key in response to attempting but failing to verify the another certificate is associated with the key pair.

3. The apparatus of claim 1, wherein the operations comprise:
receiving a request to export an additional instance of the first private key; and
rejecting exporting the additional instance of the first private key in response to receiving the request to export the additional instance of the first private key.

4. The apparatus of claim 1, wherein the operations comprise:
receiving another certificate that is not an another instance of the certificate;
verifying the another certificate is associated with the key pair; and
encrypting and then exporting an additional instance of the first private key in response to verifying the another certificate is associated with the key pair.

5. The apparatus of claim 1, wherein the operations comprise:
verifying the first computing node allows exportation of the instance of the first private key; and
exporting the instance of the first private key in response to verifying the first computing node allows exportation of the instance of the first private key;
wherein the at least one secure processor is included in a trusted execution environment (TEE).

6. The apparatus of claim 1, wherein the operations comprise:
after associating the instance of the certificate with the key pair, receiving multiple additional certificates of which none are another instance of the certificate; and
rejecting exporting an additional instance of the first private key in response to associating the instance of the certificate with the key pair and receiving the multiple additional certificates.

7. The apparatus of claim 1, wherein the operations comprise:
generating a certificate request that is coupled to the first public key; wherein (a) the instance of the certificate is coupled to a certificate chain that includes a certificate including the first public key, and (b) the second computing node corresponds to at least one of a certificate authority (CA) and a migration authority (MA);
verifying the certificate chain; and
associating the instance of the certificate with the key pair in response to verifying the certificate chain.

8. At least one non-transitory storage medium having instructions stored thereon for causing a system, including at least one secure out-of-band processor of a first computing node, to perform operations comprising:
generating a key pair including a first public key and a corresponding first private key;
receiving an instance of a certificate, including a second public key, from a second computing node located remotely from the first computing node;
associating the instance of the certificate with the key pair;
receiving an additional instance of the certificate;
verifying the additional instance of the certificate is associated with the key pair; and
encrypting and then exporting an instance of the first private key in response to verifying the additional instance of the certificate is associated with the key pair.

9. The at least one non-transitory storage medium of claim 8, the operations comprising:
after associating the instance of the certificate with the key pair, receiving another certificate that is not another instance of the certificate; and
attempting but failing to verify the another certificate is associated with the key pair.

10. The at least one non-transitory storage medium of claim 9, the operations comprising rejecting exporting an additional instance of the first private key in response to attempting but failing to verify the another certificate is associated with the key pair.

11. The at least one non-transitory storage medium of claim 10, the operations comprising:
receiving a request to export the additional instance of the first private key; and
rejecting exporting the additional instance of first private key in response to receiving the request to export the additional instance of first private key.

12. The at least one non-transitory storage medium of claim 8, the operations comprising:
receiving another certificate that is not another instance of the certificate;
verifying the another certificate is associated with the key pair; and
encrypting and then exporting an additional instance of the first private key in response to verifying the another certificate is associated with the key pair.

13. The at least one non-transitory storage medium of claim 12, the operations comprising:
storing a first identifier, which corresponds to the instance of the certificate, in at least one memory coupled to the at east one secure out-of-band processor; and
storing a second identifier, which corresponds to the another certificate, in the at least one memory.

14. The at least one non-transitory storage medium of claim 8, the operations comprising;
generating an additional key pair including an additional first public key and a corresponding additional first private key;
receiving an instance of an additional certificate including an additional second public key;
associating the instance of the additional certificate with the additional key pair;
receiving an additional instance of the additional certificate;
verifying the additional instance of the additional certificate is associated with the additional key pair; and
encrypting and then exporting an instance of the additional first private key in response to verifying the additional instance of the additional certificate is associated with the additional key pair.

15. The at least one non-transitory storage medium of claim 8, the operations comprising:
verifying the first computing node allows exportation of the instance of the first private key; and
exporting the instance of the first private key in response to verifying the first computing node allows exportation of the instance of the first private key.

16. The at least one non-transitory storage medium of claim 15 wherein verifying the first computing node allows exportation of the instance of the first private key includes reading a flag status.

17. The at least one non-transitory storage medium of claim 8, the operations comprising;
after associating the instance of the certificate with the key pair, receiving multiple additional certificates of which none are another instance of the certificate; and
rejecting exporting an additional instance of the first private key in response to associating the instance of the certificate with the key pair and receiving the multiple additional certificates.

18. The at least one non-transitory storage medium of claim 8, the operations comprising;
receiving a request to export an additional instance of the first private key; and rejecting exporting the additional instance of the first private key in response to receiving the request to export the additional instance of the first private key.

19. The at least one non-transitory storage medium of claim 8, the operations comprising:
   generating a wrapping key in response to verifying the additional instance of the certificate is associated with the key pair; and
   encrypting the instance of the first private key with the wrapping key.

20. The at least one non-transitory storage medium of claim 8, the operations comprising:
   associating a wrapping key with the key pair; and
   encrypting the instance of the first private key with the wrapping key in response to associating the wrapping key with the key pair.

21. The at least one non-transitory storage medium of claim 8, the operations comprising;
   receiving a personal identification number (PIN);
   determining a wrapping key in response to receiving the PIN; and
   encrypting the instance of the first private key with the wrapping key.

22. The at least one non-transitory storage medium of claim 21, the operations comprising:
   receiving an additional instance of the PIN;
   determining an additional instance of the wrapping key in response to receiving the additional instance of the PIN; and
   decrypting an additional instance of the first private key with the additional instance of the wrapping key.

23. The at least one non-transitory storage medium of claim 8, the operations comprising:
   generating a certificate request that is coupled to the first public key; wherein (a) the instance of the certificate is coupled to a certificate chain that includes a certificate including the first public key, and (b) the second computing node corresponds to at least one of a certificate authority (CA) and a migration authority (MA);
   verifying the certificate chain; and
   associating the instance of the certificate with the key pair in response to verifying the certificate chain.

* * * * *